(12) United States Patent
Zhang

(10) Patent No.: US 10,035,102 B2
(45) Date of Patent: Jul. 31, 2018

(54) SYSTEM FOR A UREA MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 176 days.

(21) Appl. No.: 14/945,122

(22) Filed: Nov. 18, 2015

(65) Prior Publication Data
US 2017/0136410 A1 May 18, 2017

(51) Int. Cl.
| | |
|---|---|
| F01N 3/24 | (2006.01) |
| B01D 53/94 | (2006.01) |
| B01F 3/04 | (2006.01) |
| B01F 5/06 | (2006.01) |
| B01F 5/04 | (2006.01) |
| B01F 3/02 | (2006.01) |
| F01N 3/20 | (2006.01) |
| F01N 3/28 | (2006.01) |

(52) U.S. Cl.
CPC ............ B01D 53/9431 (2013.01); B01F 3/02 (2013.01); B01F 3/04007 (2013.01); B01F 3/04049 (2013.01); B01F 5/0466 (2013.01); B01F 5/0498 (2013.01); B01F 5/0602 (2013.01); F01N 3/2066 (2013.01); F01N 3/2892 (2013.01); B01D 2251/2067 (2013.01); F01N 2240/20 (2013.01); F01N 2610/02 (2013.01); F01N 2610/1453 (2013.01); Y02T 10/24 (2013.01)

(58) Field of Classification Search
CPC ............. F01N 2240/20; F01N 2610/02; B01D 53/9431
USPC ............ 60/274, 286, 299, 301; 422/168, 177
See application file for complete search history.

(56) References Cited

U.S. PATENT DOCUMENTS

| | | | |
|---|---|---|---|
| 6,416,213 B1 | 7/2002 | Fukunaga | |
| 7,497,077 B2 | 3/2009 | Dodge et al. | |
| 7,581,387 B2 | 9/2009 | Bui et al. | |
| 7,712,305 B2 | 5/2010 | Kapsos et al. | |
| 8,756,923 B2 | 6/2014 | Tamamidis | |
| 8,844,574 B2 | 9/2014 | Grob et al. | |
| 2006/0245296 A1 | 11/2006 | Nishioka et al. | |
| 2011/0219745 A1* | 9/2011 | Griffin | B01F 3/04049 60/274 |
| 2011/0239631 A1 | 10/2011 | Bui et al. | |
| 2012/0124968 A1* | 5/2012 | Tamamidis | F01N 1/08 60/274 |
| 2013/0104531 A1 | 5/2013 | Cho et al. | |
| 2013/0247545 A1* | 9/2013 | Solbrig | F01N 3/0253 60/295 |
| 2015/0121855 A1* | 5/2015 | Munnannur | F01N 3/2066 60/295 |

OTHER PUBLICATIONS

Zhang, Xiaogang, "Exhaust Flow Device," U.S. Appl. No. 14/706,650, filed May 7, 2015, 47 pages.
Zhang, Xiaogang, "Particulate Matter Sensor," U.S. Appl. No. 15/018,637, filed Feb. 8, 2016, 40 pages.

* cited by examiner

*Primary Examiner* — Tom P Duong
(74) *Attorney, Agent, or Firm* — Julia Voutyras; McCoy Russell LLP

(57) ABSTRACT

Systems are provided for a urea mixer. In one example, the urea mixer may include perforated tube having a toroid shape configured to receive a urea injection and exhaust flow.

20 Claims, 5 Drawing Sheets

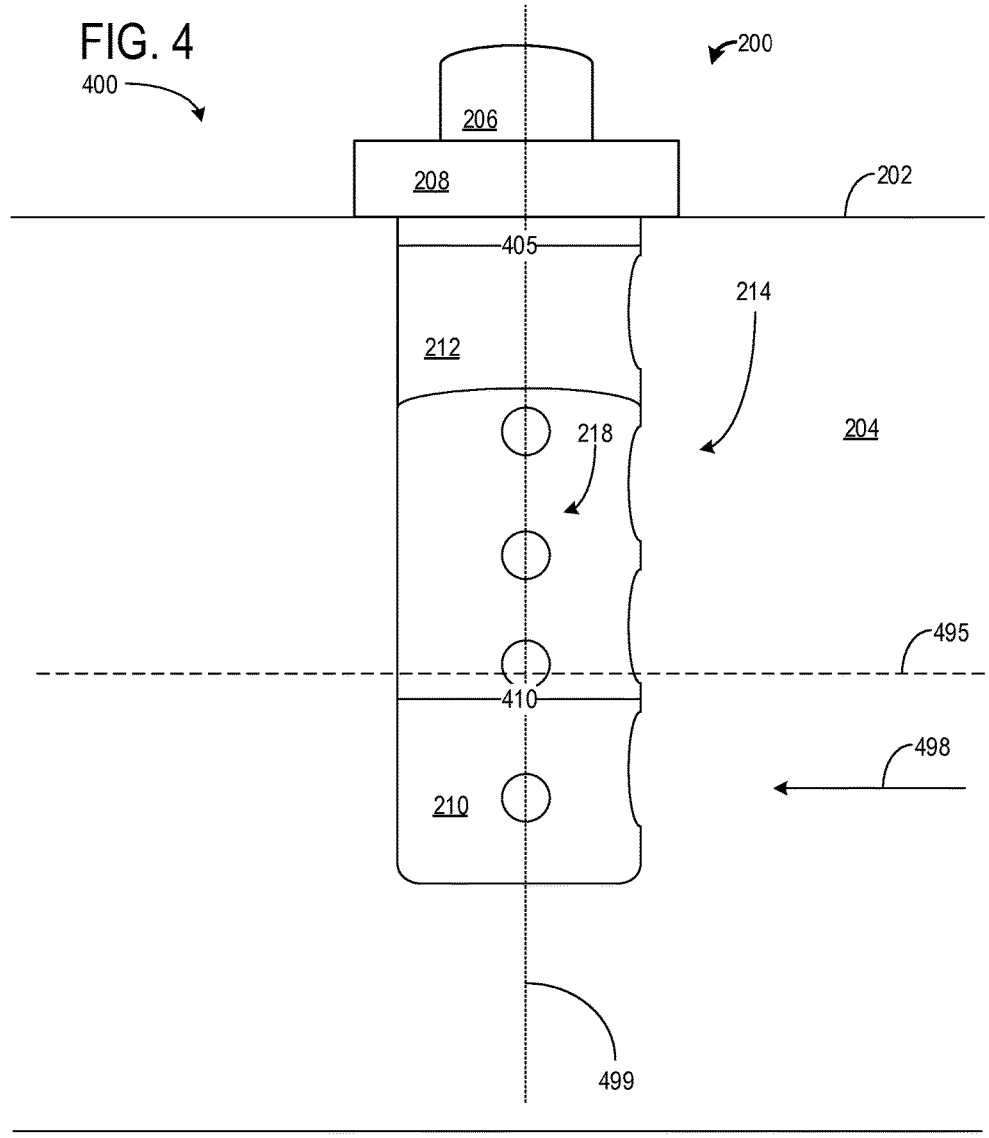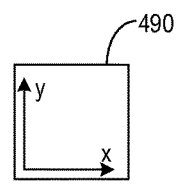

SYSTEM FOR A UREA MIXER

FIELD

The present description relates generally to a urea mixer.

BACKGROUND/SUMMARY

One technology for after-treatment of engine exhaust utilizes selective catalytic reduction (SCR) to enable certain chemical reactions to occur between NOx in the exhaust and ammonia (NH3). NH3 is introduced into an engine exhaust system upstream of an SCR catalyst by injecting urea into an exhaust pathway. The urea entropically decomposes to NH3 under high temperature conditions. The SCR facilitates the reaction between NH3 and NOx to convert NOx into nitrogen (N2) and water (H2O). However, as recognized by the inventor herein, issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between emissions (e.g., NOx) and the SCR. Additionally, overly mixing and agitating the urea in the exhaust can likewise cause issues, such as increased deposits.

Attempts to address insufficient mixing include introducing a mixing device downstream of a urea injector and upstream of the SCR such that the exhaust flow may be homogenous. Other attempts to address urea mixing include a stationary mixing apparatus. One example approach is shown by Cho et al. in U.S. 2013/0104531. Therein, a static mixer is located in an exhaust passage downstream of an external tube for injecting urea. The exhaust gas flows through the exhaust passage and combines with a urea injection before flowing through the static mixer.

However, the inventors herein have recognized potential issues with such systems. As one example, the static mixer described above presents limited mixing capabilities due to a directionality of exhaust outflow through the mixer unable to fully mix a laminar exhaust flow. The static mixer inside the exhaust passage also presents manufacturing and packaging constraints. Varying exhaust passage geometries demand an alteration in the manufacturing of the static mixer for the mixer to tightly fit within the exhaust passage.

In one example, the issues described above may be addressed by a system for a urea injector injecting urea to a perforated tube, the tube is a toroid and configured to receive exhaust gas with inlets located on an upstream face facing a direction of incoming exhaust flow in an exhaust passage. In this way, urea may mix with exhaust gas in the perforated tube before entering the exhaust passage.

As one example, the perforated tube further comprises inner and outer outlets facing a direction perpendicular to incoming exhaust flow. Additionally, the inner and outer outlets face a central region and an outer region of the exhaust passage. The urea may mix with exhaust gas in the perforated tube before flowing out either of the inner and outer outlets. A mixture flowing out of the inner outlets flows in a radial inward direction to the central region and a mixture flowing out of the outer outlets flows in a radial outward direction to the outer region. In this way, an entire exhaust flow through the exhaust passage may come into contact with urea and increase mixing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a side-on view of the mixer.
FIGS. 2-4 are shown to scale, although other relative dimensions may be used if desired.

DETAILED DESCRIPTION

Figure 1:
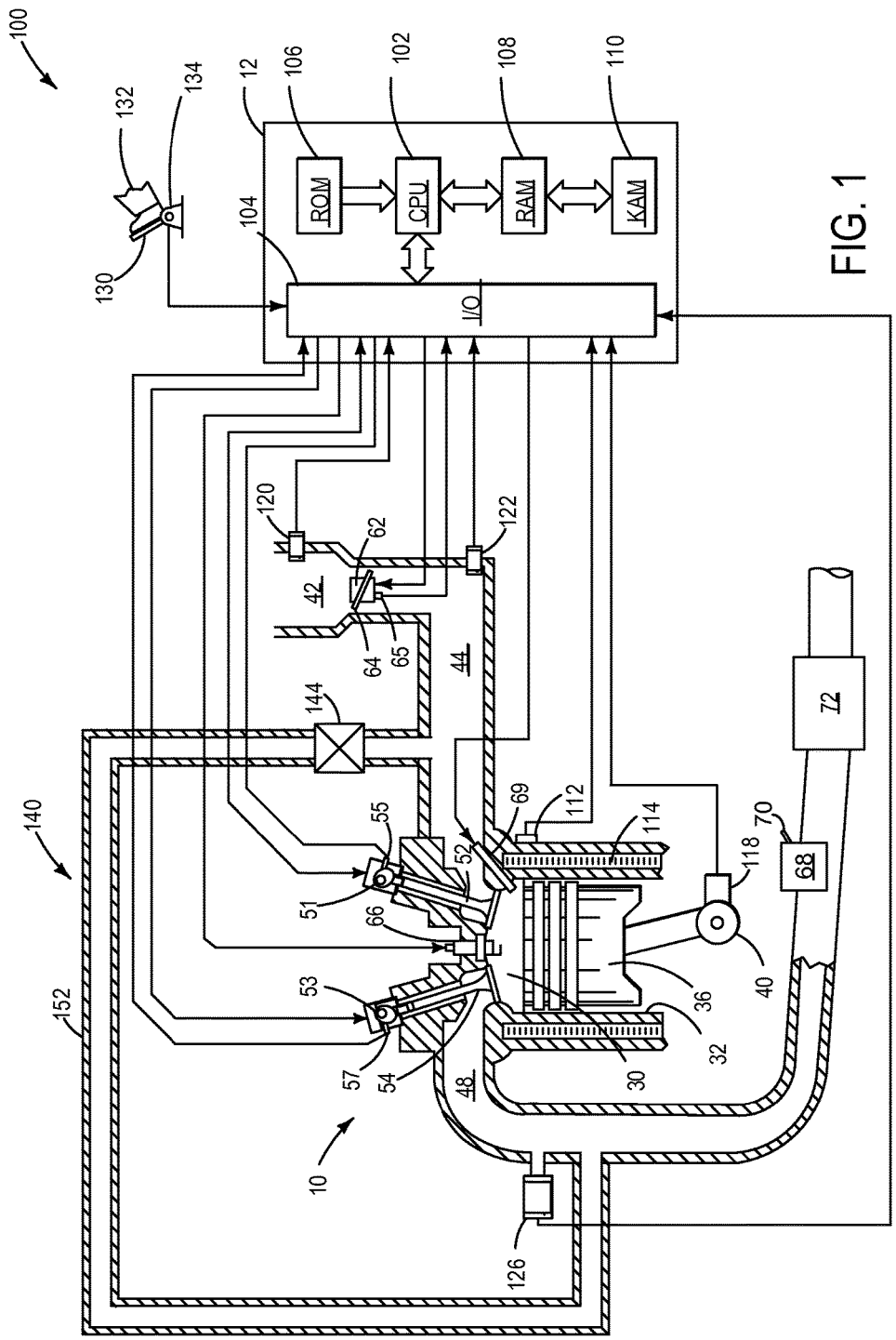
FIG. 1 shows an engine schematic.
Figure 2:
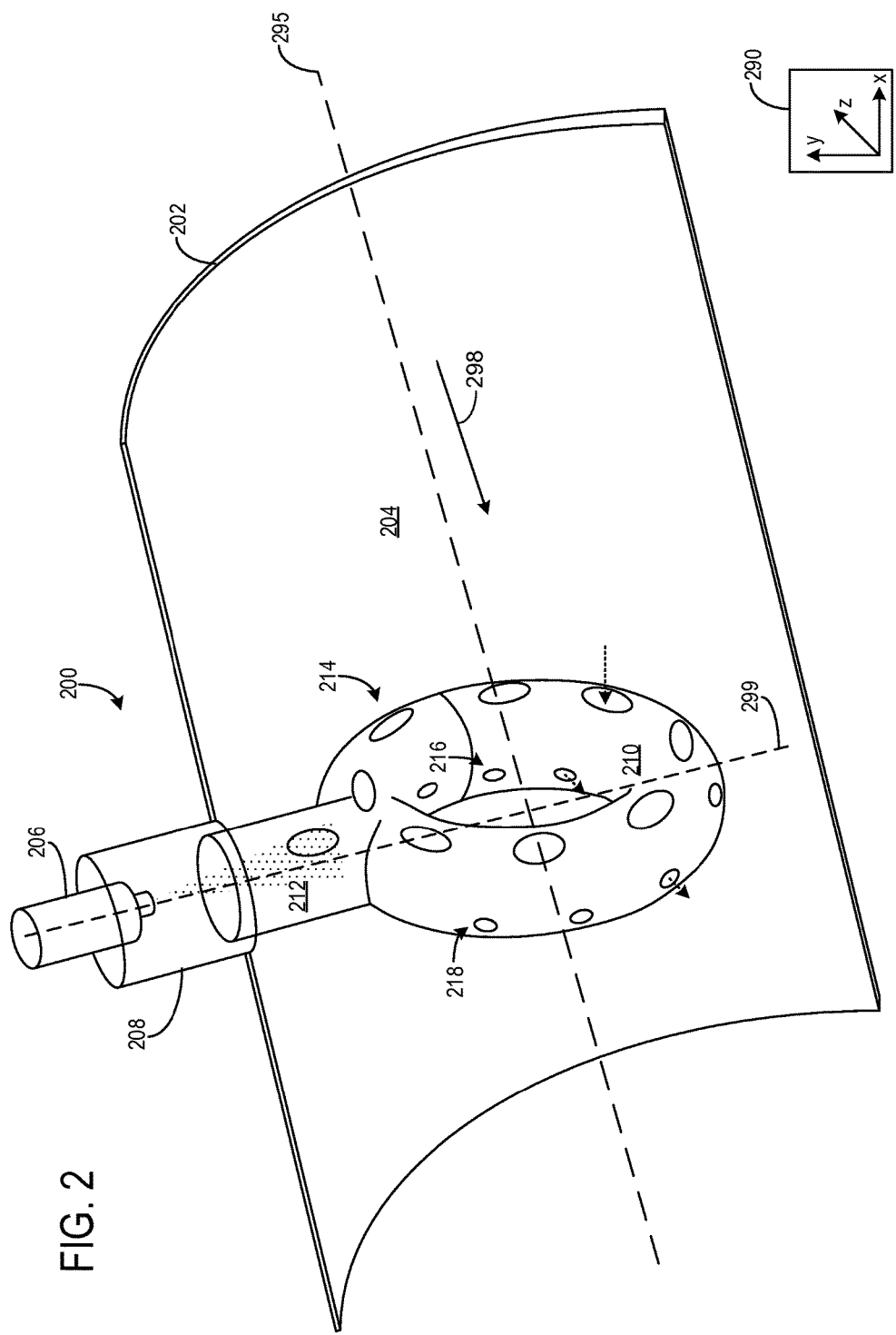
FIG. 2 shows a perspective view of a mixer in an exhaust passage coupled to an injector.
Figure 3:
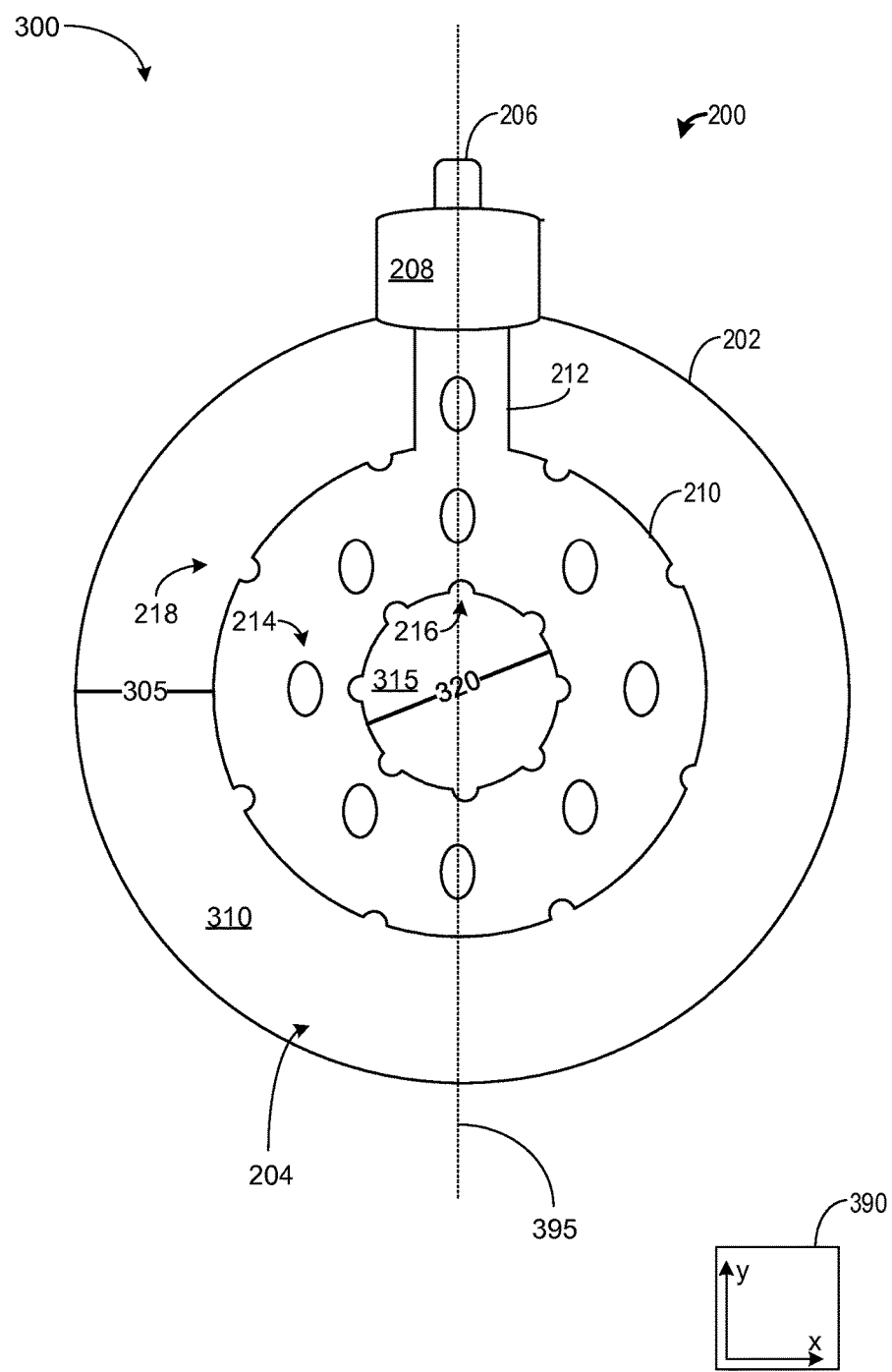
FIG. 3 shows a face-on view of the mixer.
Figure 5:
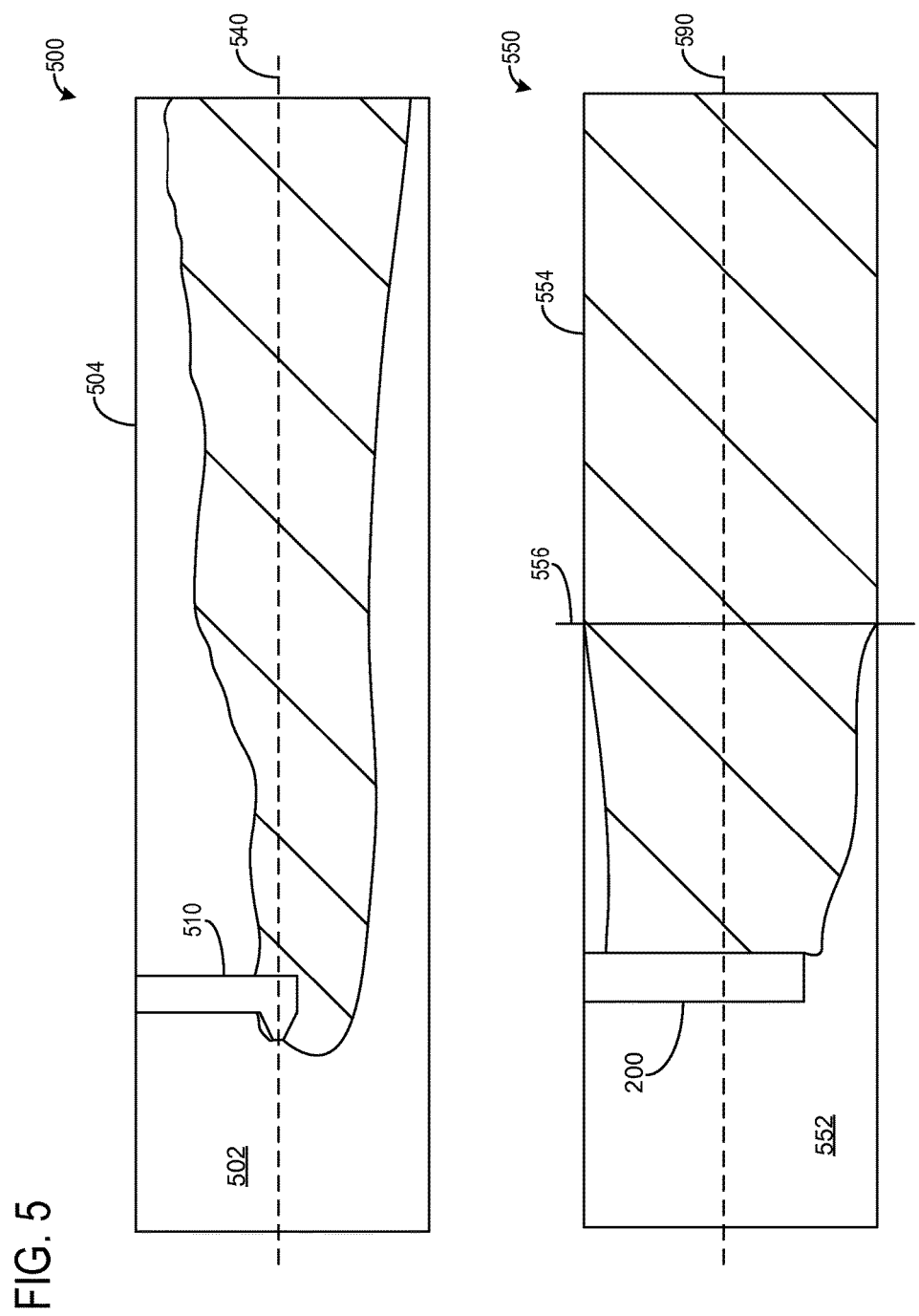
FIG. 5 shows a fluid dynamics simulation comparing a linear urea mixer to the present disclosure mixer.

The following description relates to an example urea mixer comprising a ring-shaped perforated tube protruding into an exhaust passage. An engine coupled to the mixer is shown in FIG. 1. The mixer may be located upstream of an SCR catalyst, where the mixer may increase urea mixing in exhaust flow. The mixer is a perforated ring with a linear passage fluidly connected to a urea injector, as shown in FIG. 2. The ring may generate myriad exhaust flows. A face-on view of the mixer is shown in FIG. 3. A side-on view of the mixer is shown in FIG. 4. The mixer may extend an exhaust flow path, where a distance of exhaust flow is increased when the exhaust gas is intercepted by the ring. The increased distance may increase urea mixing without increasing packaging constraints. Furthermore, inlets and outlets of the ring may enhance mixing compared to a linear mixer as shown in FIG. 5.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 72 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 72 is shown arranged along the exhaust passage 48 downstream of both the exhaust gas sensor 126 and a mixer 68. The device 72 may be a three way catalyst (TWC), $NO_x$ trap, selective catalytic reductant (SCR), various other emission control devices, or combinations thereof. In some examples, during operation of the engine 10, the emission control device 72 may be periodically reset by operating at least one cylinder of the engine within a particular air-fuel ratio.

The mixer 68 is shown upstream of the emission control device 72 and downstream of the exhaust gas sensor 126. In some embodiments, additionally or alternatively, a second exhaust gas sensor may be located between the mixer 68 and the emission control device 72. The mixer 68 is fluidly coupled to a urea injector 70. The mixer 68 comprises a linear tube contiguous with a toroid-shaped (donut-shaped) perforated tube. The tube is configured to receive exhaust gas and further comprises a common interior passage for mixing the urea and exhaust gas. Perforations of the tube are configured to direct a mixture of urea and exhaust gas to regions of the exhaust passage 48 radially adjacent to the mixer 68.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting an oxidation state of the SCR may include adjusting an actuator of the urea injector to inject urea to reduce the SCR.

FIG. 2 shows a perspective view of a mixer 200 in an exhaust passage 204. The mixer 200 is contiguous and hollow, with an uninterrupted passage located therein for mixing urea with exhaust gas. The mixer 200 is configured to receive exhaust gas via a plurality of inlets and to expel exhaust gas to portions of the exhaust passage 204 radially adjacent to the mixer 200. In the current depiction, a portion of an exhaust pipe 202 to reveal the mixer 200.

An axes system 290 is shown comprising three axes, an x-axis in the horizontal direction, a y-axis in the vertical direction, and the z-axis in a direction perpendicular to both the x and y axes. A central axis 295 of the exhaust pipe 202 is depicted by a large dash line and is substantially parallel to the x-axis. The central axis 295 may also be a central axis of the perforated tube 210. A mixer central axis 299 is shown by a medium dash line. The mixer central axis 299 is substantially parallel to the y-axis and thus, perpendicular to the central axis 295. Arrow 298 depicts an overall direction of exhaust flow in the exhaust passage 204. Small dash line arrows depict a direction of exhaust flow through the mixer 200. Large dashes are bigger than medium dashes, which are bigger than small dashes.

The mixer 200 may be a single machined piece. The mixer 200 may be composed of one or more of a ceramic material, a metal alloy, a silicon derivative, or other suitable materials capable of withstanding high temperatures while also mitigating friction experienced by an exhaust flow such that an exhaust pressure is maintained. Additionally or alternatively, the mixer 200 may comprise of one or more coatings and materials such that exhaust may contact surfaces of the mixer 200 without depositing soot or other exhaust gas components on the mixer 200. The mixer 200 extends downwardly along the mixer central axis 299 into the exhaust passage 204. The mixer 200 is stationary and non-rotatably fixed.

An adapter 208 fluidly connects an injector 206 to the mixer 200. The adapter 208 is tubular with a circular cross-section along the x-axis. The injector 206 may be used similarly as injector 70 in the embodiment of FIG. 1. The injector 206 may be coupled to a urea reservoir and inject urea based on a signal received from a controller (e.g., controller 12). The adapter 208 is in face-sharing contact with an outer surface of the exhaust pipe 202. An internal space 209 is located in the adapter 208 outside of the exhaust pipe 202, fluidly coupled to the injector 206 and the mixer 200. In one example, urea may be injected into the internal space, where exhaust gas may flow to and sweep the urea into the mixer 200. In another example, urea may be injected past the internal space 209 directly into the mixer 200. In this way, the injector 206 may inject urea inside the perforated tube 210 in a direction perpendicular to the central axis 295. There is an opening in the exhaust pipe 202 corresponding to the internal space 209 and the mixer 200 such that urea and/or exhaust may flow between the two. The adapter 208 is hermetically sealed and fully enclosed from an ambient atmosphere. Exhaust gas and/or urea in the internal space 209 may only exit the internal space via the opening, which directs the exhaust gas and/or urea into the mixer 200. The mixer 200, adapter 208, and injector 206 align along the mixer central axis 299. In one example, exhaust and/or urea from the internal space 209 flows directly into a linear tube 212.

The linear tube 212 is aligned with the adapter 208 along the mixer central axis 299. The linear tube 212 is an upper portion of the mixer 200 contiguous with the perforated tube 210. The tubes are hollow and fully intersect with a common interior passage located therein. The common interior passage bifurcates from the linear tube 212 to the perforated tube 210, wherein the common interior passage spans an entire 360° of the perforated tube 210. The linear tube 212 is cylindrical whereas the perforated tube 210 is toroidal. A cross-section of the linear tube 212 is circular along the x and z axes. A cross-section of the perforated tube 210 is two circles along the central axis 295 in the x-direction. Cross-sections of the tubes may be other suitable shapes, such as elliptical, square, rectangular, diamond, triangular, pentagonal, hexagonal, etc. A cross-section of the perforated tube 210 is a donut-shape along the y-axis. An inner diameter of the linear tube 212 may be substantially equal to an inner diameter taken along any portion inside of the perforated tube 210 in one example, as is shown in FIG. 4. In another example, the inner diameter of the linear tube 212 may be greater than or less than the inner diameter of the toroid of the perforated tube 210.

The perforated 210 and linear 212 tubes are configured to receive exhaust gas via a plurality of inlets 214 located on an upstream side (face), relative to a direction of exhaust flow. The perforated tube 210 comprises a greater number of inlets 214 than the linear tube 212. The inlets 214 face a direction of incoming exhaust flow. Exhaust gas from the exhaust passage 204 may flow uninterruptedly into the common interior passage of the mixer 200 via the inlets 214. Exhaust gas may flow through any portion of the common interior passage. For example, exhaust gas may flow 360° around the perforated tube 210 and/or into the linear tube 212. Exhaust gas in the linear tube 212 may also flow into the internal space 209. Exhaust gas in the internal space 209 and the linear tube 212 may not flow into the exhaust passage 204. In this way, a plurality of outlets 216 are located on the perforated tube 210.

The plurality of outlets comprises inner outlets 216 and outer outlets 218 located on inner and outer radii of the perforated tube 210. The internal space 209 and the linear tube 212 do not comprise any inner 216 or outer 218 outlets. This forces exhaust gas and urea in the linear tube 212 to flow through the perforated tube 210 before entering the exhaust passage 204. The inner outlets 216 face a direction radially inward to the central axis 295. The outer outlets 218 faces a direction radially outward away from the central axis 295 toward the exhaust pipe 202. Thus, the inner outlets 216 emit an exhaust gas/urea mixture to a different region of the exhaust passage 204 compared to the outer outlets 218. Furthermore, exhaust flowing out of the inner 216 and outer 218 outlets flows in a direction perpendicular to arrow 298 (exhaust flow). A number of inner 216 and outer 218 outlets may be equal or unequal. A size of the inner 216 and outer 218 outlets may be equal or unequal.

The inlets 214 and inner 216 and outer 218 outlets are oblong, however, the inlets and outlets may be other suitable shapes (circular, square, etc.). The inlets 214 may be larger than the inner 216 and outer 218 outlets. In one example, the inlets 214 may be exactly twice as large as the outlets. In another example, the inlets 214 may be less than or greater than twice as large as the outlets. A number of inlets 214 may be equal to a number of inner outlets 216 and a number of outer outlets 218. In this way, there may be twice as many outlets (combined inner and outer outlets) as inlets 214. As another example, a combined number of inner 216 and outer 218 outlets may equal a number of inlets 214. A total surface area of inlets and outlets may be substantially equal in one example such that a rate of exhaust entering the mixer 200 is substantially equal to a rate of exhaust exiting. In this way, an exhaust backpressure is reduced. Alternatively, a surface area of the inlets may be greater than a surface area of the outlets such that the rate of exhaust entering the mixer 200 is greater than a rate of exhaust exiting. In this way, exhaust gas may be forced to be further mixed in the mixer 200. The mixer 200 comprises no other inlets or additional outlets to the exhaust passage other than those specified herein. Additionally, the mixer 200 does not comprise any outlets (perforations) facing a downstream direction.

As shown, exhaust gas may flow through the inlets 214 and out the inner outlets 216 and the outer outlets 218. However, more convoluted flow paths may exist. For example, exhaust may enter through the inlets 214, flow around any portion of the mixer 200, and out via either the inner 216 or outer 218 outlets. Exhaust gas in the linear tube 212 may mix with urea in the internal space 209. The mixture may flow into the perforated tube 210 and mix with portions of exhaust gas that do not comprise urea. In this way, urea is mixed in the mixer 200 prior to flowing into the exhaust passage 204. The mixture of urea and exhaust gas is directed to regions of the exhaust passage 204 where exhaust gas is unlikely to enter the mixer 200 (radially adjacent to the mixer 200) as will be described below in FIG. 3. As an example, exhaust gas may flow around the mixer 200 via flowing adjacent to the exhaust pipe 202 or along the central axis 295. Exhaust gas in these areas may come into contact with exhaust gas being expelled by the outer outlets 218 or the inner outlets 216, respectively. In this way, the mixer 200 redirects exhaust flow from a region aligned with the inlets 214 to remaining regions of the exhaust passage 204 via the inner 216 and outer 218 outlets. This redirection may increase urea mixing and may improve SCR reactivity. Additionally, a pedasis (Brownian motion) of the urea may be increased by flowing exhaust gas with the urea in the mixer 200, but also by flowing the urea/exhaust gas mixture out of the mixer 200 in a direction 90° to exhaust gas flow. Entropy may increase, possibly generating increased turbulence and mixing.

FIG. 3 shows a face-on view 300 of the mixer 200. Thus, components previously introduced are similarly number in subsequent figures. As shown, the mixer 200 is physically coupled to an adapter 208 housing an injector 206. The mixer 200 is configured to receive a urea injection and exhaust gas flow such that a mixture of urea and exhaust may form within a common interior passage of the mixer 200 before flowing to an exhaust passage 204.

An axes system 390 includes two axes, an x-axis parallel to the horizontal axis and a y-axis parallel to the vertical axis. A central axis 395 of the mixer 200 is parallel to the y-axis via a dashed line.

The mixer 200 comprises a perforated tube 210 and a linear tube 212 fully intersecting with a common interior passage located therein. Both the tubes comprise inlets 214 facing a direction opposite exhaust flow. The perforated tube 210 comprises inner 216 and outer 218 outlets facing opposite radial directions. The inner outlets 216 are located on an opposite side of the mixer 200 compared to the outer outlets 218. The outlets are radially misaligned with the inlets 214 on the perforated tube. Misaligning in this way may increase exhaust gas turbulence in the mixer 200, which may improve urea mixing. In one embodiment, additionally or alternatively, the inner outlets 216 may be radially misaligned with the outer outlets 218.

The perforated tube 210 is concentric with the exhaust pipe 202. An outer region 310 is located between the perforated tube 210 and the exhaust pipe 202 and may allow exhaust gas to flow through uninterruptedly. The outer region 310 is radially adjacent to the mixer 200 and may receive exhaust and/or urea from the outer outlets 218. Exhaust flow in the outer region 310 may be substantially perpendicular to exhaust and/or urea flowing out of the outer outlets 218.

The perforated tube 210 is spaced away from the exhaust pipe 202 by a distance 305. The distance 305 may be substantially equal around an entire outermost circumference of the perforated tube 210. In one example, the distance 305 may be substantially equal to a length of the linear tube 212. In another example, the distance 305 may be greater than or less than the length of the linear tube 212. In this way, the perforated (toroidal) tube is evenly spaced away from an exhaust pipe inner wall with respect to an outer wall of the perforated tube having outlets and an inner wall of the perforated tube having outlets.

A central region 315 is located in a middle of the perforated tube 210 along a central axis (e.g., central axis 295 of FIG. 2) of the exhaust passage. The inner outlets 216 are evenly spaced about the central axis by an inner distance 320 360° around the central axis of the exhaust passage. In one example, the inner distance 320 may be substantially equal to the distance 305. Exhaust flow through the exhaust passage 204 may be laminar due to friction generated by the exhaust pipe 202. The inner outlets 216 expel urea and/or exhaust gas from the common interior passage of the mixer 200 into the central region 315 in a direction substantially 90° (perpendicular) to exhaust flow. This may alter the exhaust flow such that an exhaust flow front is substantially even and no longer laminar. In this way, urea mixing may be increased.

As described above, the inner outlets 216 and the outer outlets 218 deliver an exhaust/urea mixture to different regions of the exhaust passage 204. The regions are separated by the mixer 200. Exhaust gas in the regions collides with the mixture flowing out of the mixer, which may increase urea dispersion throughout the mixer. By doing this, a urea concentration may be substantially equal along an entire exhaust passage downstream of the mixer 200. This may improve an SCR device reactivity.

FIG. 4 shows a side-on view 400 of the mixer 200. As shown, the adapter 208 is in face-sharing contact with an outer surface of the exhaust pipe 202, fluidly coupled to an injector 206 and to the mixer 200. The injector 206 may inject urea during some conditions in order to decrease an oxidation state of one or more compounds in an SCR device located downstream of the mixer 200. The mixer 200 may improve urea mixing with exhaust gas in order to provide urea to a greater surface area of the SCR, which may increase SCR oxidative abilities for subsequent exhaust gas treatment.

An axes system 490 includes two axes, an x-axis parallel to the horizontal axis and a y-axis parallel to the vertical axis. A central axis 495 of the exhaust passage 204 is parallel to the x-axis. A central axis 499 of the mixer is parallel to the y-axis (perpendicular to the central axis 495). Arrow 498 depicts a general direction of exhaust flow in the exhaust passage 204.

The inlets 214 are evenly spaced apart from each other. The outer outlets 218 are also evenly spaced apart from each other while being radially misaligned with the inlets 214. The outer outlets 218 face a direction 90° (perpendicular) to the inlets 214. This forces exhaust gas to turn in the mixer 200 in order to re-enter the exhaust passage 204. This increases an exhaust gas flow distance and perturbs an exhaust gas flow. The inner outlets 216 are occluded in the side-on view 400 by the perforated tube 210. As shown, the linear tube 212 does not comprise outer outlets 218. A linear tube inner diameter 405 is substantially equal to a perforated tube inner diameter 410, as shown.

FIG. 5 shows a fluid dynamics simulation 500 of a prior art urea mixer 510 and a fluid dynamics simulation 550 of a present disclosure mixer (e.g., mixer 200 of FIG. 2). The simulations depict an ability of the mixers to disperse urea through all of an exhaust passage. The simulations are conducted in substantially similar environments, which may include engine load, exhaust temperature, exhaust velocity, exhaust pressure, exhaust pipe length, exhaust pipe material, etc. Additionally, the mixers are located at similar locations along an exhaust passage.

The prior art mixer 510 is a straight tube injector configured to receive a urea injection and exhaust gas. A urea/exhaust gas mixture may exit the prior art mixer 510 via an outlet facing a direction of exhaust flow located proximal to a bottom portion of the prior art mixer 510. The prior art mixer 510 directs the mixture along a central axis 540 of the exhaust passage 502.

In the fluid dynamics simulation 500, the mixture does not contact an interior surface of an exhaust pipe 504. Thus, an outer region (e.g., outer region 310) of the exhaust passage 502 may not comprise the mixture. Furthermore, a urea concentration along the exhaust passage 502 of the simulation 500 is unequal, wherein portions of exhaust gas near the central axis 540 consist of a greater concentration of urea than portions of exhaust gas near the exhaust pipe 504.

An SCR device located downstream of the prior art urea mixer 510 may not be fully reduced due to insufficient mixing and may operate at a less-than-desired level.

In the fluid dynamics simulation 550, the mixture contacts an interior surface of an exhaust pipe 554 in less than half a length of the exhaust passage 552 indicated by a line 556. In one example, the length may be exactly 50 mm. The mixture flows through the exhaust passage 502 adjacent to a central axis 590, the exhaust pipe 554, and in areas located therebetween. A urea concentration along the exhaust passage 552 is substantially even, wherein a sample of exhaust near the central axis 590 may comprise a substantially equal concentration of urea compared to a sample proximal the exhaust pipe 554. In this way, an SCR catalyst may be located closer to the mixer 200 compared to the prior art mixer 510 while experiencing greater urea reactivity due to the increased urea dispersion. This decreases packaging restraints while increasing an SCR reactivity.

In this way, a compact, easy to design urea mixer may be located along an exhaust passage upstream of an SCR device. The urea mixer may increase urea mixing by combining exhaust and urea in the mixer and releasing the mixture to the exhaust passage in a direction substantially perpendicular to exhaust flow. The urea mixer further directs the mixture to outer and inner regions of the exhaust passage, increasing a homogeneity of exhaust/urea flow. The technical effect of configuring a urea mixer to receive a urea injection and exhaust flow is to improve SCR reactivity via increased urea dispersion. The mixer may further reduce packaging constraints by mixing the urea throughout the exhaust passage in less distance compared to the prior art. This enables a manufacturer to locate the SCR catalyst nearer to the urea mixer compared to the prior art.

A system comprising a urea injector positioned to inject urea inside a perforated toroidal tube positioned in engine exhaust flow and configured to receive exhaust gas with inlets located on an upstream face facing a direction of incoming exhaust flow in an exhaust passage. A first example of the system including an SCR catalyst is positioned downstream of the perforated tube, wherein the injector is positioned to inject only inside the tube from the injector nozzle. A second example of the system optionally including the first example further includes where the perforated tube further comprises inner outlets facing a radially inward direction toward a central axis of the exhaust passage. A third example of the system optionally including one or more of the second and first examples further includes where the perforated tube further comprises outer outlets facing a radially outward direction from the central axis on an opposite side of the perforated tube. A fourth example of the system optionally including the first through third examples further includes where the perforated tube is concentric with an exhaust pipe, wherein outlets face only radially inward and radially outward, and wherein there are no perforations facing downstream. A fifth example of the system optionally including the first through fourth examples the perforated tube is coupled to an adapter housing the injector via a linear tube, the tubes having a common interior passage bifurcating from the linear tube to the perforated tube. A sixth example of the system optionally including the first through fifth examples and further includes where the linear tube comprises inlets and no outlets to the exhaust passage. A seventh example of the system optionally including the first through sixth examples and further includes where the perforated tube spans an entire 360° around a central axis of the exhaust passage. An eighth example of the system optionally includes the first through seventh examples and further includes where the perforated tube comprises a donut-shaped cross-section, and wherein the injector injects perpendicular to a central axis of the toroid. A ninth example of the system optionally includes the first through eighth examples and further includes where the perforated tube further comprises outlets radially misaligned with the inlets, and wherein a central axis of the toroid aligns with a central axis of an exhaust passage carrying the exhaust flow and in which the mixer is positioned.

A urea mixer comprising an upper, linear tube contiguous with a lower, toroidal tube, inlets located on upstream sides of the tubes and outlets located on radial sides of the toroidal tube, and a urea injector coupled to an adapter with an internal space located therein, the internal space fluidly coupling the urea injector to the linear tube. A first example of the urea mixer includes where the linear tube is physically coupled to the adapter. A second example of the urea mixer optionally including the first example includes where exhaust gas flowing out of the outlets flows in a direction perpendicular to a direction of exhaust gas flowing into the inlets. A third example of the urea mixer optionally includes the second and/or first examples and includes where the linear tube and the toroidal tube are symmetric about a central mixer axis. A fourth example of the urea mixer optionally including the first through third examples and includes where a number of outlets is greater than a number of inlets. A fifth example of the urea mixer optionally including the first through fourth examples and includes where the toroidal tube is evenly spaced away from an exhaust pipe inner wall with respect to an outer wall of the toroidal tube having outlets and an inner wall of the toroidal tube having outlets. A sixth example of the urea mixer optionally including the first through fifth examples and further including where the linear and toroidal tubes are hollow and fully intersect one another with a common interior passage located therein. A seventh example of the urea mixer optionally including the first through sixth examples and further including where the common interior passage bifurcates from the linear tube to the toroidal tube, and where the common interior passage spans an entire 360° of the toroidal tube.

A urea mixer comprising an adapter comprising a hollow internal space, the adapter is coupled to a urea injector and a linear tube, a toroidal tube concentric with an exhaust pipe is physically coupled to and contiguous with the linear tube, the tubes comprising inlets configured to receive exhaust gas of an exhaust passage, a common interior passage of the tubes is fluidly connected to the internal space where exhaust gas may flow through the common interior passage and the internal space, and inner and outer outlets located along radii of the toroidal tube, where the inner outlets face a direction radial inward to a central axis of the exhaust passage and the outer outlets face a direction radial outward from the central axis. A first example of the urea mixer further includes where there are no other inlets and no additional outlets in the linear or toroidal tubes other than those specified.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a urea injector positioned to inject urea inside a linear tube fluidly coupled to a perforated toroidal tube of a fixed radius positioned in engine exhaust flow and configured to receive exhaust gas with inlets located on an upstream face facing a direction of incoming exhaust flow in an exhaust passage, wherein a common interior passage bifurcates from the linear tube to the perforated tube.

2. The system of claim 1, wherein an SCR catalyst is positioned downstream of the perforated tube, wherein the injector is positioned to inject only inside the linear tube from a single injector nozzle.

3. The system of claim 1, wherein the perforated tube further comprises inner outlets facing a radially inward direction toward a central axis of the exhaust passage.

4. The system of claim 3, wherein the perforated tube further comprises outer outlets facing a radially outward direction from the central axis on an opposite side of the perforated tube, and where the radially inward and outward directions are perpendicular to the direction of incoming exhaust flow.

5. The system of claim 1, wherein the perforated tube is concentric with an exhaust pipe, wherein outlets face only radially inward and radially outward, and wherein there are no perforations facing downstream.

6. The system of claim 1, wherein exhaust gas flows into the common interior passage via the inlets, and where the exhaust gas mixes with urea in the common interior passage.

7. The system of claim 6, wherein the linear tube comprises inlets and no outlets to the exhaust passage, the linear tube inlets facing the direction of incoming exhaust flow.

8. The system of claim 1, wherein the perforated tube spans an entire 360° around a central axis of the exhaust passage and does not comprise a free end.

9. The system of claim 1, wherein the perforated tube comprises a donut-shaped cross-section along a plane perpendicular to its central axis, and wherein the injector injects perpendicular to a central axis of the perforated tube.

10. The system of claim 1, wherein the perforated tube further comprises outlets radially misaligned with the inlets, and wherein a central axis of the perforated tube aligns with a central axis of the exhaust passage carrying the exhaust flow and in which the perforated tube is positioned.

11. A urea mixer comprising:
an upper, linear tube contiguous with a lower, toroidal tube of a fixed radius relative to a central axis of an exhaust passage;
inlets located on upstream sides of the tubes and outlets located on radial sides of the toroidal tube, wherein there are no downstream facing openings; and
a urea injector coupled to an adapter with an internal space located therein, the internal space fluidly coupling the urea injector to the linear tube.

12. The urea mixer of claim 11, wherein the linear tube is physically coupled to the adapter.

13. The urea mixer of claim 11, wherein exhaust gas flowing out of the outlets flows in a direction perpendicular to a direction of exhaust gas flowing into the inlets.

14. The urea mixer of claim 11, wherein the linear tube and the toroidal tube are symmetric about a central mixer axis parallel to a direction of urea injection.

15. The urea mixer of claim 11, wherein a number of outlets is greater than a number of inlets, and where the inlets are larger than the outlets.

16. The urea mixer of claim 11, wherein the toroidal tube is evenly spaced away from an exhaust pipe inner wall with respect to an outer wall of the toroidal tube having outlets and an inner wall of the toroidal tube having outlets.

17. The urea mixer of claim 11, wherein the linear and toroidal tubes are hollow and fully intersect one another with a common interior passage located therein.

18. The urea mixer of claim 17, wherein the common interior passage bifurcates from the linear tube to the toroidal tube, and where the common interior passage spans an entire 360° of the toroidal tube.

19. A urea mixer comprising:
an adapter comprising a hollow internal space, the adapter coupled to a urea injector and a linear tube;
a toroidal tube of a fixed radius concentric with an exhaust pipe physically coupled to and contiguous with the linear tube, the tubes comprising inlets configured to receive exhaust gas of an exhaust passage, the toroidal tube uniformly spaced away from interior surfaces of the exhaust passage;
a common interior passage of the tubes fluidly connected to the hollow internal space where exhaust gas may flow through the common interior passage and the hollow internal space; and
inner and outer outlets located along radii of the toroidal tube, where the inner outlets face a direction radially inward to a central axis of the exhaust passage and the outer outlets face a direction radially outward from the central axis, the inner and outer outlets being configured to eject a mixture of urea and exhaust gas in a direction perpendicular to exhaust gas flow in the exhaust passage.

20. The urea mixer of claim 19, wherein there are no other inlets and no additional outlets in the linear or toroidal tubes other than those specified.

* * * * *